United States Patent
Reid et al.

(10) Patent No.: US 12,194,533 B2
(45) Date of Patent: Jan. 14, 2025

(54) MODIFICATION OF A 3D MODEL OF A 3D OBJECT

(71) Applicant: Hewlett-Packard Development Company, L.P., Spring, TX (US)

(72) Inventors: Carl R. Reid, Vancouver, WA (US); Daniel Fradl, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 273 days.

(21) Appl. No.: 17/642,258

(22) PCT Filed: Oct. 22, 2019

(86) PCT No.: PCT/US2019/057419
§ 371 (c)(1),
(2) Date: Mar. 11, 2022

(87) PCT Pub. No.: WO2021/080569
PCT Pub. Date: Apr. 29, 2021

(65) Prior Publication Data
US 2022/0326682 A1    Oct. 13, 2022

(51) Int. Cl.
| | |
|---|---|
| *B22F 10/80* | (2021.01) |
| *B22F 10/10* | (2021.01) |
| *B22F 10/64* | (2021.01) |
| *B33Y 30/00* | (2015.01) |
| *B33Y 50/00* | (2015.01) |
| *G05B 19/4099* | (2006.01) |
| *G06F 30/17* | (2020.01) |

(52) U.S. Cl.
CPC .............. *B22F 10/80* (2021.01); *B22F 10/10* (2021.01); *B22F 10/64* (2021.01); *B33Y 30/00* (2014.12); *B33Y 50/00* (2014.12); *G05B 19/4099* (2013.01); *G06F 30/17* (2020.01); *G05B 2219/49023* (2013.01)

(58) Field of Classification Search
CPC ........... B22F 10/80; B33Y 50/00; G06F 30/17
USPC ....................................................... 700/118
See application file for complete search history.

(56) References Cited

U.S. PATENT DOCUMENTS

| | | | |
|---|---|---|---|
| 9,757,801 B2 | 9/2017 | Gunster et al. | |
| 10,328,491 B2 | 6/2019 | Heikkila | |
| 2014/0107823 A1* | 4/2014 | Huang | B29C 64/393 |
| | | | 700/98 |

(Continued)

FOREIGN PATENT DOCUMENTS

CN         106426916 A  *  2/2017

*Primary Examiner* — Ronald D Hartman, Jr.
(74) *Attorney, Agent, or Firm* — Michael Dryja

(57) ABSTRACT

According to examples, an apparatus may include a processor and a memory on which are stored machine-readable instructions that when executed by the processor, cause the processor to access a 3D model of a 3D object to be fabricated and apply a deformation to the 3D model. In some examples, the processor may generate a modified 3D model that compensates for a determined deformation of the 3D object during a sintering process for the 3D object. In some examples, the deformation model may include a densification component associated with a density of the 3D object and a deformation component associated with mechanical loads on the 3D object. The densification component may have initial state values associated with the density of the 3D object during the sintering process.

17 Claims, 5 Drawing Sheets

(56) References Cited

U.S. PATENT DOCUMENTS

| | | | |
|---|---|---|---|
| 2015/0352794 A1* | 12/2015 | Nguyen | B22F 10/25 |
| | | | 700/98 |
| 2016/0175934 A1* | 6/2016 | Lacy | B23K 26/342 |
| | | | 219/76.1 |
| 2018/0001381 A1 | 1/2018 | Kimblad et al. | |
| 2018/0304360 A1 | 10/2018 | Fontana et al. | |
| 2018/0304365 A1 | 10/2018 | Brzezinski et al. | |
| 2018/0307209 A1* | 10/2018 | Chin | G06F 30/17 |

* cited by examiner

MODIFICATION OF A 3D MODEL OF A 3D OBJECT

BACKGROUND

In three-dimensional (3D) printing, an additive printing process may be used to make 3D solid parts from a digital model. Some 3D printing techniques are considered additive processes because they involve the application of successive layers or volumes of a build material, such as a powder or powder-like build material, to an existing surface (or previous layer). 3D printing often includes post-processing such as sintering for solidification of the build material.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
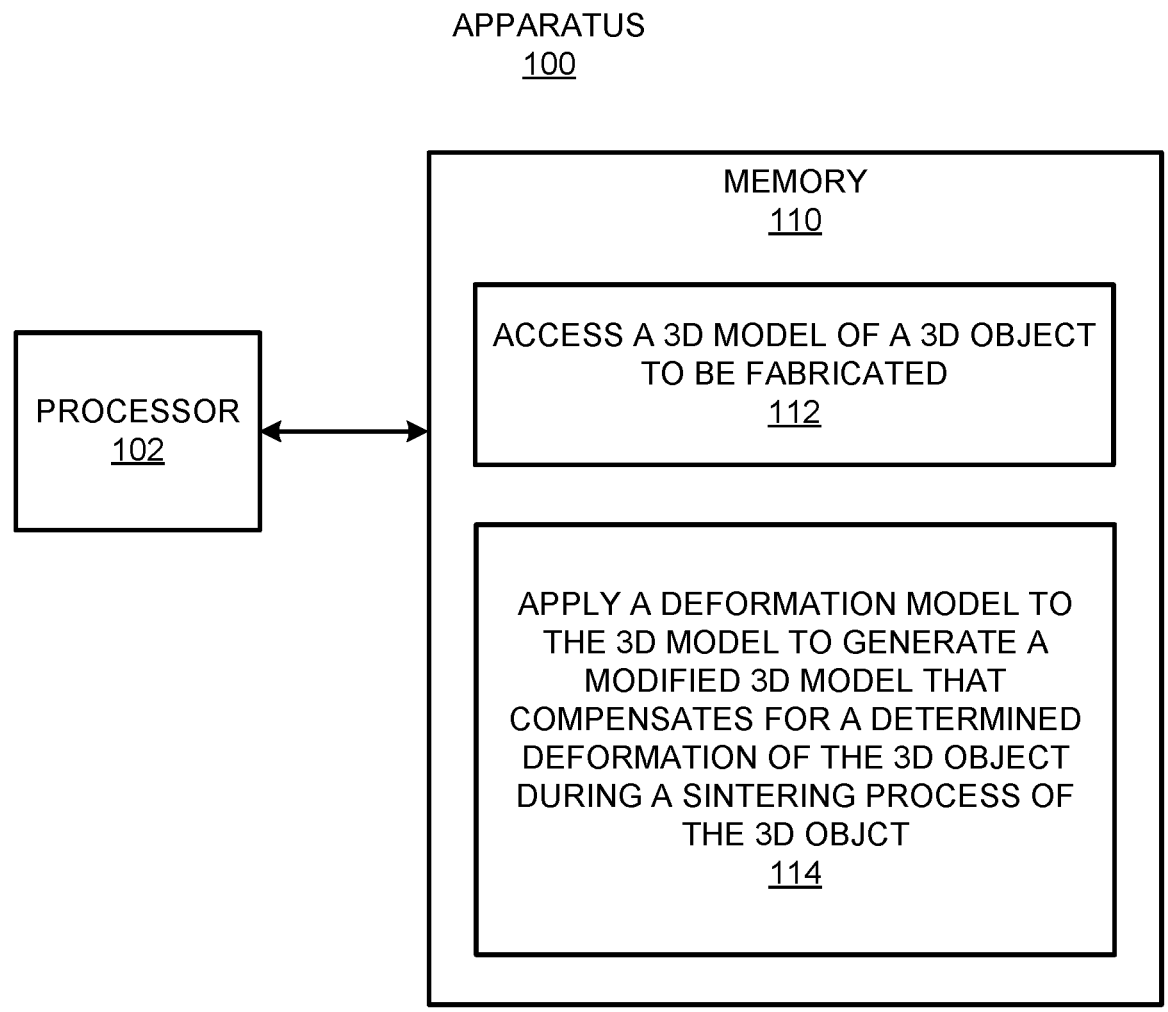
FIG. 1 shows a block diagram of an example apparatus for generating a modified 3D model of a 3D object that compensates for a determined deformation of the 3D object during a sintering process of the 3D object.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to; "including" means including but not limited to; "based on" means based at least in part on.

In some additive manufacturing technologies, build material particles, e.g., in powder form, may be distributed in thin layers and selected areas of the powder layers may be joined together using a binder agent. The binder agent may bind the selected areas of the powder layers to create a "green part.", for example following application of a suitable energy such as ultra-violet or heat energy. In some examples, the green part may undergo post-print processing, e.g., sintering or the like, after the powder is selectively bound, to form the 3D objects. In some examples, sintering techniques may be used to convert powdered material into a final part having increased density and strength. Sintering may involve the application of relatively high temperatures and may result in deformations in the 3D object due to densification as well as external loads such as gravity.

Disclosed herein are apparatuses, methods, and computer-readable mediums for compensating for deformations on a 3D object caused by sintering by determining the deformations that are predicted to occur on the 3D object during a sintering process on the 3D object. In addition, the original 3D model may be modified to compensate for the determined deformations, which may allow for the post-sintered part to have dimensions that are closer to the original 3D model. In some examples, a deformation model (or equivalently, a sinter model) may be applied to a 3D model of a part to generate a modified 3D model that comprises a deformation of the 3D object that is determined to occur during application of heat onto the 3D object. In some examples, the deformation model may be applied to the 3D model in reverse, for example, such that time is decremented rather than incremented in the deformation model as is described in further detail hereinafter with reference to FIG. 3B.

As discussed herein, the deformation model may include a densification component associated with a relative density of the 3D object and a deformation component associated with mechanical loads on the 3D object. In some examples, a processor may determine the values of the densification component independently of the mechanical load values that are associated with the deformation component. The deformation model may treat the relative density as a state variable that is independent of other deformations such as deformation from gravity and/or friction.

By way of particular example, the deformation model may include state values including a densification component associated with the relative density of the 3D object and a deformation component associated with mechanical loads on the 3D object. The state values including the densification component and the deformation component are described in further detail hereinafter. In some examples, the densification component may have initial/final state values associated with the density of the 3D object before/after the sintering process. In some examples, final state values associated with densification may be determined using initial values and model parameters, and the final state values may be used as initial state values for reverse deformation modelling. The target net shape (e.g., desired post-sintered shape) of the 3D object and reverse deformation boundary conditions (e.g., gravity) may be set, and the deformation model may be applied to the 3D model in reverse, with time decrementing instead of incrementing. In some examples, the modified 3D model may include the determined deformation of the 3D object predicted to occur during the sintering process.

Through implementation of the present disclosure, a 3D model may incorporate deformations that may occur in the 3D object during sintering into the original shape to be fabricated, thereby enabling the final 3D object to be fabricated with dimensions that more accurately correspond to intended dimensions. The increased accuracy in the final 3D object may reduce or eliminate the need for post-processing to address deformations such as the need for supports for sagging features, live setters, machining operations, and/or the like. As a result, 3D objects may be fabricated with greater quality as well as greater efficiency and reduced manufacturing operations and costs.

Figure 2:
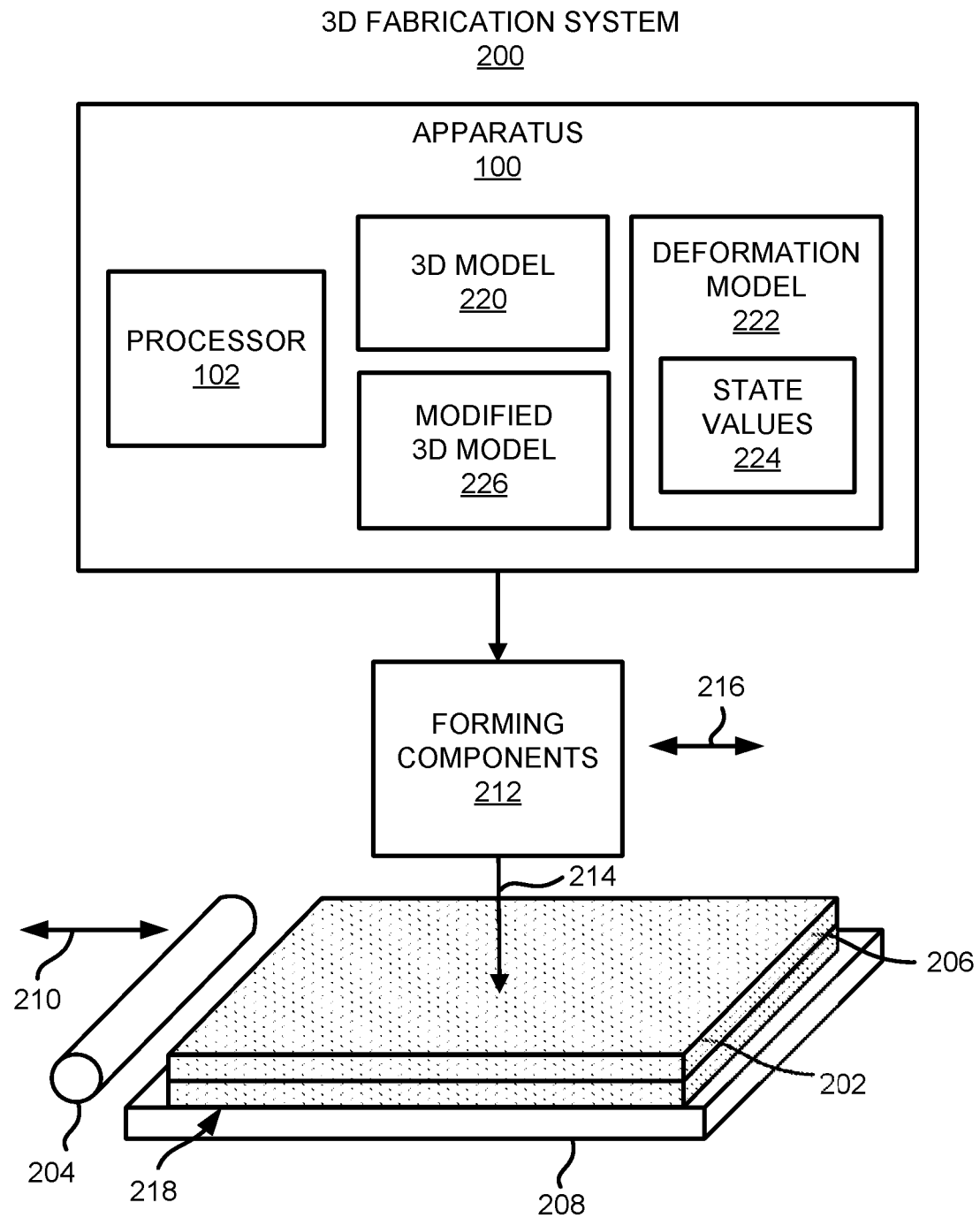
FIG. 2 shows a diagram of an example 3D fabrication system in which the apparatus depicted in FIG. 1 may be implemented.
Figure 3A:
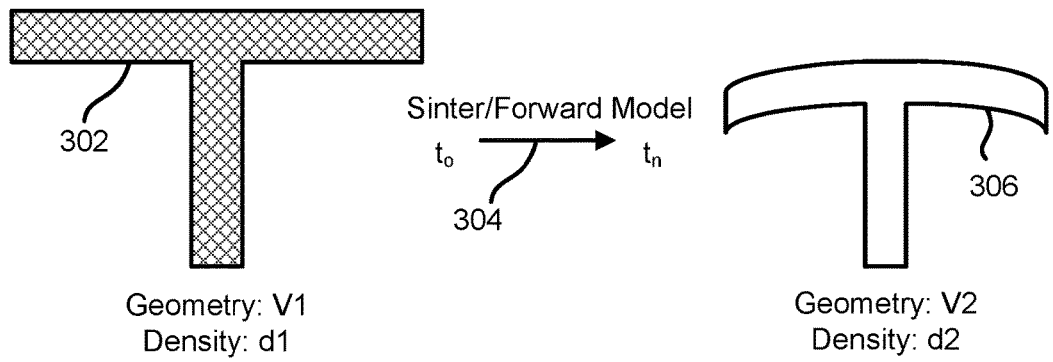
FIG. 3A shows a process diagram of an example process of sintering a 3D object or applying a deformation model as depicted in FIG. 2 to a 3D object.
Figure 3B:
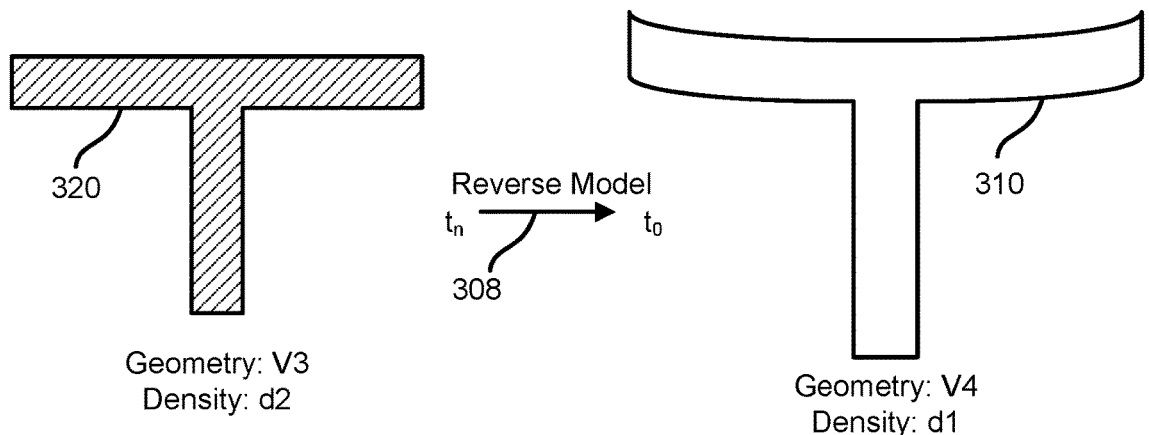
FIG. 3B shows a process diagram of an example process of applying a deformation model in reverse to a 3D model having final state and dimensional values to generate a modified 3D model.
Figure 3C:
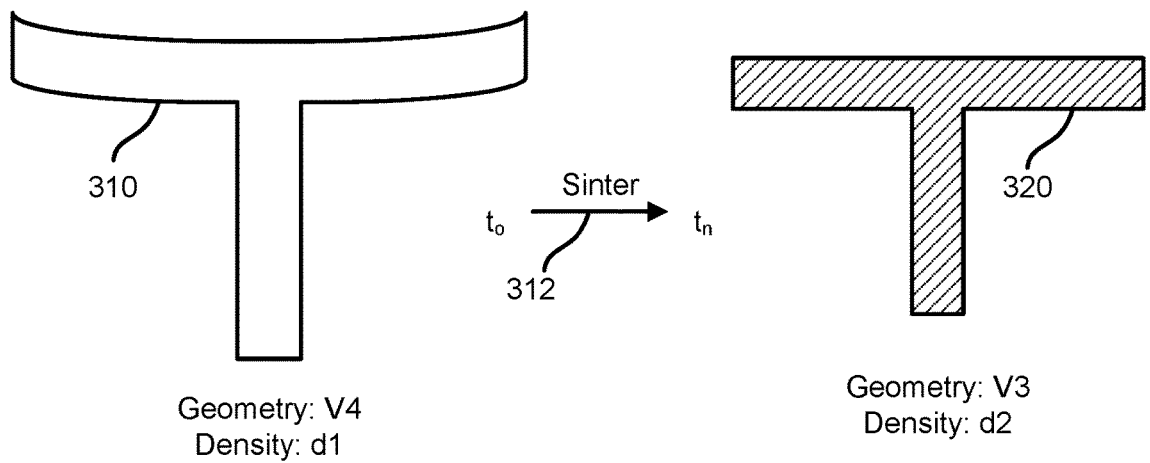
FIG. 3C shows a process diagram of an example process of sintering a modified 3D model as depicted in FIG. 2 to fabricate a target 3D object.

Reference is made first to FIGS. 1, 2, and 3A-3C. FIG. 1 shows a block diagram of an example apparatus 100 for generating a modified 3D model 226 of a 3D object (not shown) that compensates for a determined deformation of the 3D object during a sintering process of the 3D object. FIG. 2 shows a diagram of an example 3D fabrication system 200 in which the apparatus 100 depicted in FIG. 1 may be implemented. FIG. 3A shows a process diagram of an example process of sintering a 3D object or applying a deformation model 222 as depicted in FIG. 2 to a 3D object, FIG. 3B shows a process diagram of an example process of applying a deformation model 222 in reverse to a 3D model 220 having final state and dimensional values to generate a modified 3D model 226, and FIG. 3C shows a process diagram of an example process of sintering a modified 3D model 226 as depicted in FIG. 2 to fabricate a target 3D object 320. It should be understood that the target 3D object 320 may be equivalent to a 3D object 320 as used herein, and the target 3D object 320 may be the 3D object 320 that has the desired state and dimensional values. It should be understood that the example apparatus 100 depicted in FIG. 1, the example 3D fabrication system 200 depicted in FIG. 2, and/or the example processes depicted in FIGS. 3A-3C may include additional features and that some of the features described herein may be removed and/or modified without departing from the scopes of the apparatus 100, the 3D fabrication system 200, and/or the example processes of FIGS. 3A-3C.

The apparatus 100 may be a computing device, a tablet computer, a server computer, a smartphone, or the like. The apparatus 100 may also be part of a 3D fabrication system 200, e.g., a control system of the 3D fabrication system 200. Although a single processor 102 is depicted, it should be understood that the apparatus 100 may include multiple processors, multiple cores, or the like, without departing from a scope of the apparatus 100.

The 3D fabrication system 200, which may also be termed a 3D printing system, a 3D fabricator, or the like, may be implemented to fabricate 3D objects through selectively binding build material particles 202, which may also be termed particles 202 of build material, together. In some examples, the 3D fabrication system 200 may use binder agents to selectively bind the particles 202. In some examples, a binder agent may be UV-curable or thermally-curable.

The binder agent may be included, as mentioned, in a liquid vehicle for application to the build material particles 202. For example, the binder agent may be present in the liquid vehicle at from about 1 wt % to about 50 wt %, from about 2 wt % to about 30 wt %, from about 5 wt % to about 25 wt %, from about 10 wt % to about 20 wt %, from about 7.5 wt % to about 15 wt %, from about 15 wt % to about 30 wt %, from about 20 wt % to about 30 wt %, or from about 2 wt % to about 12 wt %.

In one example, the binder agent may include polymer particles, such as latex polymer particles. The polymer particles may have an average particle size that may range from about 100 nm to about 1 µm. In other examples, the polymer particles may have an average particle size that may range from about 150 nm to about 300 nm, from about 200 nm to about 500 nm, or from about 250 nm to 750 nm.

In one example, the latex particles may include any of a number of copolymerized monomers, and may in some instances include a copolymerized surfactant, e.g., polyoxyethylene compound, polyoxyethylene alkylphenyl ether ammonium sulfate, sodium polyoxyethylene alkylether sulfuric ester, polyoxyethylene styrenated phenyl ether ammonium sulfate, etc. The copolymerized monomers can be from monomers, such as styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, or combinations thereof. In some examples, the latex particles can include an acrylic. In other examples, the latex particles can include 2-phenoxyethyl methacrylate, cyclohexyl methacrylate, cyclohexyl acrylate, methacrylic acid, combinations thereof, derivatives thereof, or mixtures thereof. In another example, the latex particles can include styrene, methyl methacrylate, butyl acrylate, methacrylic acid, combinations thereof, derivatives thereof, or mixtures thereof.

The build material particles 202 may include any suitable material for use in forming 3D objects 302 that requires post-print processing such as sintering. In some examples, the build material particles 202 may be metal particles that the 3D fabrication system 200 may selectively bind using the binder agent to form a green body, e.g., a part that is to be sintered.

Additionally, the build material particles 202 may be formed to have dimensions, e.g., widths, diameters, or the like, that are generally between about 5 µm and about 100 µm. In other examples, the particles may have dimensions that are generally between about 30 µm and about 60 µm. The particles 102 may have any of multiple shapes, for instance, as a result of larger particles being ground into smaller particles.

The 3D fabrication system 200 may include a spreader 204 (e.g., a roller) that may spread the build material particles 202 into layer 206 (also referred to herein as a "build layer"). In some instances, the build material particles 202 may be formed into multiple successive layers 206, and each layer may contain a portion of bound build material particles 202 that forms the 3D object 302. The build material particles 202 in each of the successive layers 206 may be deposited, e.g., through movement of the spreader 204 across a build platform 208 as indicated by the arrow 210.

As also shown in FIG. 2, the 3D fabrication system 200 may include forming components 212 that may output energy and/or agent 214 onto the layer 206 as the forming components 212 are scanned across the layer 206 as denoted by the arrow 216. The forming components 212 may also be scanned in the direction perpendicular to the arrow 216 or in other directions. For instance, the forming components 212 may selectively output an agent 214, e.g., a thermally-curable agent, onto locations of the layer 206 that are to be joined together as the forming components 212 are scanned in the direction denoted by the arrow 216. In some examples, the agent 214 may be applied to selected locations on a plurality of stacked layers 206 and heat may be applied on the stacked layers 206 to cure the stacked layers 206 together, e.g., in a curing operation. In addition or in other examples, heat may be applied onto each of the layers 206 prior to the formation of respective subsequent layers 206.

The fabrication system 200 may include a build zone 218 (e.g., powder bed) within which the forming components 212 may bind the build material particles 202 in the layer 206. In other examples, the forming components 212 may include a binder agent delivery device that may deposit a binder agent 214, such as an adhesive that may bind build material particles 202 upon which the binder agent is deposited. In some examples, the binder agent may be a heat and/or light curable agent.

The bound/solidified build material particles 202 may be surrounded by build material particles 202 that have not been bound or solidified. These remaining build material particles 202 that have not been bound or solidified may be termed unbound build material particles, or the like. In any regard, the bound/solidified build material particles 202 may be a part of a 3D object 302, and the 3D object 302 may be built through selective binding/solidifying of the build material particles 202 in multiple layers 206 of the build material particles 202. As discussed herein, a post-print processing operation may be performed, for instance, to sinter the bound/solidified build material particles 202, as depicted by the arrow 304 in FIG. 3A, to fabricate a 3D object 306 having increased density and strength relative to bound/solidified object 302.

As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. The apparatus 100 may also include a memory 110 that may have stored thereon machine-readable instructions 112-114 (which may also be termed computer-readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer-readable storage medium, may be a non-transitory machine-readable storage medium, where the term "non-transitory" does not encompass transitory propagating signals.

The processor 102 may fetch, decode, and execute the machine-readable instructions 112 to access a 3D model 220 of a 3D object 320 to be fabricated. The processor 102 may access the 3D model 220 from a data store (not shown) or another source. In any regard, the 3D model 220 may include information regarding dimensions, shapes, colors, relative densities, and/or other physical properties of the 3D object 320 to be fabricated.

Referring to FIG. 1, the processor 102 may fetch, decode, and execute the machine readable instructions 114 to apply a deformation model 222 (e.g., applied in reverse) to the 3D model 220. In some examples, the processor 102 may generate a modified 3D model 226 that compensates for a deformation of the 3D object 320 during a sintering process 304/312 for the 3D object 320. For instance, the modified 3D model 226 may correspond to a 3D object 310 that has a shape (e.g., geometry V4) including a compensation for the deformation during the sintering process 304/312. The deformation model 222 may include state values 224 including a densification component associated with a density of the 3D object 310 and a deformation component associated with mechanical loads on the 3D object 310. The densification component may have initial state values 224 associated with the density of the 3D object 320 after the sintering process 304.

Generally, and as depicted in FIG. 3A, the 3D object 302 may undergo deformations including shrinkage and warping during the sintering process 304, which may result in a deformed 3D object 306. In some examples, these deformations may be modeled using the deformation model 222 to predict the shape and relative densities of the resulting 3D object 306. In some examples, the actual dimensions of the deformed 3D object 306 may be measured to determine actual deformations, which may be used to improve the accuracy of the deformation model 222.

Sintering and the deformations associated with sintering may be time, temperature, and microstructural state dependent phenomena. In some examples, to model the process 304, expressions that describe the material response or rates of change as functions of time, temperature, and a description of the current state may be required, e.g., state values 224. In some examples, a response of a given 3D object to the sintering process may be quantified via an Initial Value Problem (IVP), in which the initial geometry and state of pertinent variables may be defined and the evolving state of the given 3D object may be calculated based on a time/temperature history, eventually arriving at the final deformed geometry and state of the 3D object.

Because of the complexity of part geometries, boundary conditions, and functional forms from material models, the sintering process 304 may be modeled using the IVP method, and the model may progress through time and may calculate and update necessary quantities along the way as the deformation model 222 is applied. For sintering, the IVP method may include a starting geometry, a material state, a temperature history, a material model, time dependent boundary conditions, or another appropriate variable depending on the application. In some examples, a known geometry with an initial state may be input and the output may be the final geometry and state at the end of the prescribed sintering thermal history. In some examples, to determine a modified 3D model 226, the final geometry and state may be presumed to be known and an antecedent geometry and state may be the unknowns.

By way of particular example, equation 1 may define deformation (strain) increments at any point during a sintering process. It should be understood that equation 1 is described herein as being one example, and other appropriate equations may equally be implemented to define the deformation.

$$\Delta \varepsilon^{total} = \tfrac{1}{3}\Delta \varepsilon^{vol} M + \Delta \varepsilon^{dev} N \qquad \text{Equation 1}$$

where $\Delta \varepsilon^{total}$ is the total strain tensor increment, $\Delta \varepsilon^{vol}$ is the magnitude of the volumetric part of the deformation, M is a tensor in the material directions that quantifies the volumetric deformation components (M may be an identity tensor in an isotropic material), $\Delta \varepsilon^{dev}$ is the magnitude of the deviatoric (e.g., shape changing) deformation, and N defines the active deviatoric deformation components.

The left side of equation 1 defines spatially varying total strain increments that are summed over time to generate a final geometry. The first term on the right describes a volumetric response and the second term on the right describes the remaining shape changing deformation.

In some examples, in the deformation model 222, a relative density v may be used as a proxy for whatever is occurring at a microstructural level. The deformation model 222 may determine the relative density as a function of time and temperature during the sintering process 304. In some examples, changes in relative density may be directly related to volumetric changes, which may be related to an expression for the volumetric component in equation 1 above.

In some examples, the deformation model 222 may determine changes in density in the 3D object 306 during sintering. In some examples, the processor 102 may determine state values of the densification component independently of mechanical load values that are associated with the deformation component. By way of particular example, a deformation model that describes density changes may be described in two ways: those that involve "sintering stress", or those that involve Master Sintering Curves (MSC), which may define the current relative density as a function of a given time and/or temperature history. By way of particular example, in an MSC type deformation model, when $v_o$ is the original relative density, the current relative density v may be determined using equation 2:

$$v = v_o + \frac{1 - v_o}{1 + \exp\left[-\frac{\ln\Theta - a}{b}\right]} \quad \text{where}$$

$$\Theta(t, T) \overset{def}{=} \int_0^t \frac{1}{T}\exp\left[-\frac{Q}{RT}\right]dt$$

Equation 2

Here, v and $v_o$ are the current and initial relative densities, a and b are data fitting model parameters, Q is an activation energy for the specific powder system 202, R is the ideal gas constant, T is the time dependent absolute temperature, t is time, and Θ is the value of the time and temperature integral as defined.

Material constants in equation 2 may be determined for a given powder system through experimentation, use of previously known values, through publicly available data sources, and/or another appropriate source of information. By way of particular example, when a temperature T is known as a function of time, the Θ integral in equation 2 may be evaluated explicitly and the relative density v may then be calculated at any point in time with time starting at t=0.

The second term in equation 1 of the deformation model 222 may represent a high temperature creep phenomenon. The second term in equation 1 may represent a viscous model, in which a viscosity is a function f of the current relative density with an Arrhenius temperature dependence is depicted in equation 3:

$$\text{viscosity} = f(v) \cdot \exp\left(\frac{Q}{RT}\right)$$

Equation 3

In some examples, the deformation model 222 may be represented by equations 1 through 3 to predict a shape of an arbitrary 3D object 306 after the sintering process 304 as depicted in FIG. 3A. In some examples, the 3D object 302 (or 3D model) may have initial state values for dimensions (Volume: V1) and relative density (Density: d1), and the deformed 3D object 306 may have state values which have changed due to sintering, e.g., changed dimensions (Volume: V2) and changed relative density (Density: d2). In some examples, the 3D object 302 may be an arbitrary 3D object for determining the densification component in the deformation model 222 that is associated with the sintering process 304. In some examples, the 3D object 302 may have a geometry V1 that corresponds to the geometry of the 3D model 220 (e.g., V1 may be the same as V3) and a density d1 associated with a density of the 3D model 220 prior to sintering, which may be used to determine the post-sintering density d2.

Referring to FIG. 3B, in some examples, the processor 102 may apply the deformation model 222 to a 3D model 220 to generate a modified 3D model 310. Generally, a sintering analysis may begin at time zero and may progress forward in time to predict what the final shape of a part may be given its initial geometry, initial relative density, and a specified temperature history. In some examples, the processor 102 may take a desired target geometry (V3) and the final sintered density (d2) as the initial computational state of the part (e.g., the initial state values) and the deformation model 222 may be invoked to have two modifications. The first modification may be that mechanical loads on the system may be reversed, e.g., gravity may be defined to pull up instead of down. The second modification may be related to a computational implementation of the relative density expression, Equation 2. In some examples, since a sinter temperature history to which the 3D object will be subjected may be known, a final value of the Θ integral as depicted in equation 2 may be computed independent of any deformations, and this final value may be used for the initial condition for this quantity (e.g., the initial state values, d2). During application of the deformation model 222, the processor 102 may normally compute the modified loads, except that the temperature history may be run in reverse and the Θ integral may be decremented in time (e.g., from $t_n$ to $t_0$) so that at the end of the computation, its value is zero—"reverse time integration". As depicted in FIG. 3B, this process (308) may generate the modified 3D model 310, which may be the antecedent geometry and state (V4, d1) that when actually sintered via process 312 (and/or 304) will result in the target geometry and state (e.g., V3,d2).

As depicted in FIG. 3C, when the modified 3D object 310 undergoes the sintering process 312, the modified 3D object 310 may be deformed to result in the target 3D object 320 that has the same or substantially the same shape, e.g., dimensions, as the original 3D model 220. In some examples, density d1 of the modified 3D object 310 may be the same as or substantially the same as the density d1 of a pre-sintered 3D object 302, and the density d2 of the target 3D object 320 may be the same as the density d2 of the deformed 3D object 306 after the sintering process 304. In some examples, when the processor 102 applies the deformation model 222 to the modified 3D object 310 (e.g., in the forward direction), a predicted version of the target 3D object 320 may result.

Figure 4:
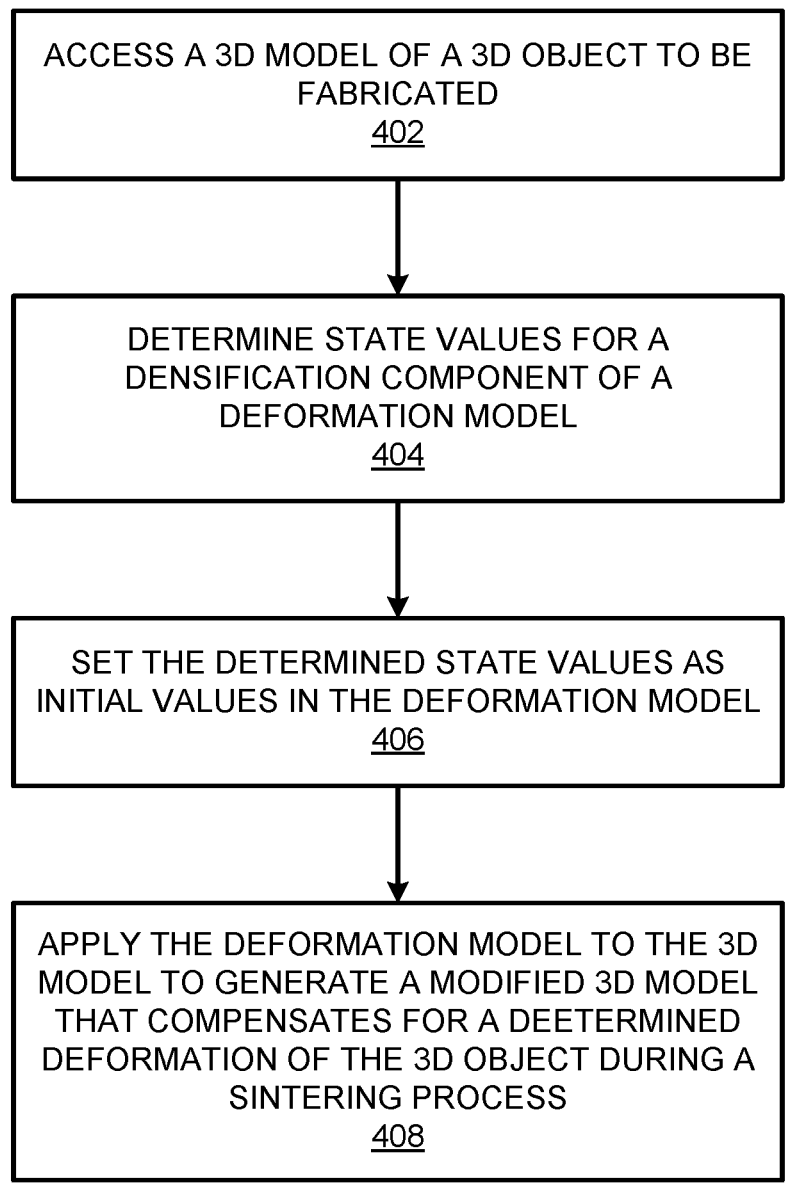
FIG. 4 shows a flow diagram of an example method for applying a deformation model to generate a modified 3D model for a 3D object that compensates for a deformation of the 3D object during a sintering process of the 3D object.

Turning now to FIG. 4, there is shown a flow diagram of an example method 400 for applying a deformation model 222 to generate a modified 3D model 226 for a 3D object 310 that compensates for a deformation of the 3D object 310 during a sintering process 312 of the 3D object 310. It should be understood that the method 400 depicted in FIG. 4 may include additional operations and that some of the operations described therein may be removed and/or modified without departing from the scope of the method 400. The description of the method 400 is also made with reference to the features depicted in FIGS. 1 and 3A-3C for purposes of illustration. Particularly, the processor 102 of the apparatus 100 may execute some or all of the operations included in the method 400.

At block 402, the processor 102 may access a 3D model 220 of a 3D object 320 to be fabricated. At block 404, the processor 102 may determine state values 224 for a densification component of a deformation model 222, the state values 224 corresponding to a state d2 of a 3D object 302 after a sintering process 304 for the 3D object 302 and the densification component being associated with a density d2 of the 3D object 306. In some examples, the densification component d2 may be different than a densification component d1 to reflect changes in the relative density of a 3D object after the sintering process 304. This computation may be done independently of any deformations associated with mechanical loads. In some examples, the 3D object 302 may be an arbitrary 3D object that is to undergo a sintering process 304 and used to determine the densification component d2. By way of particular example, the processor 102 may determine state values 224 for the densification component using the 3D model 220 for 3D object 320 (e.g., having a geometry V3, and initial pre-sintered density d1).

At block 406, the processor 102 may set the determined state values 224 as initial values in the deformation model 222. In some examples, the initial values may be relative density values d2 of the 3D object 306 after the sintering process 304. At block 408, the processor 102 may apply the deformation model 222 to the 3D model 220 to generate a modified 3D model 310 that compensates for a determined deformation of the 3D object 310 during or after the sintering process 304 resulting in the 3D object 320. In some examples, the deformation model 222 may be applied in reverse so that time is incremented backwards.

In some examples, the processor 102 may determine the state values 224 for the densification component. In some examples, the state values 224 may be determined based on the deformation model 222 applied to a predetermined 3D model that is different than the 3D model 220. In some examples, the densification component may be determined independently of mechanical load values that are associated with a deformation component of the deformation model 222. In some examples, the processor 102 may determine a target 3D object 320 that is determined to result from the 3D model 220 after the sintering process of the 3D object 310, and determine reverse deformation boundary conditions for the deformation model, the reverse deformation boundary conditions being associated with mechanical loads applied to the 3D object during the sintering process of the 3D object. The processor 102 may apply the deformation model 222 to the target shape 320 in reverse 308 based on the reverse deformation boundary conditions. In some examples, the reverse deformation boundary conditions may include a gravity value and/or a friction value that are reversed. In some examples, the processor 102 may apply the deformation model 222 on the 3D object 320 in reverse 308 by decrementing time in the deformation model 222.

Some or all of the operations set forth in the method 400 may be contained as utilities, programs, or subprograms, in any desired computer accessible medium. In addition, the method 400 may be embodied by computer programs, which may exist in a variety of forms. For example, the method 400 may exist as machine-readable instructions, including source code, object code, executable code or other formats.

Any of the above may be embodied on a non-transitory computer-readable storage medium. Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 5:
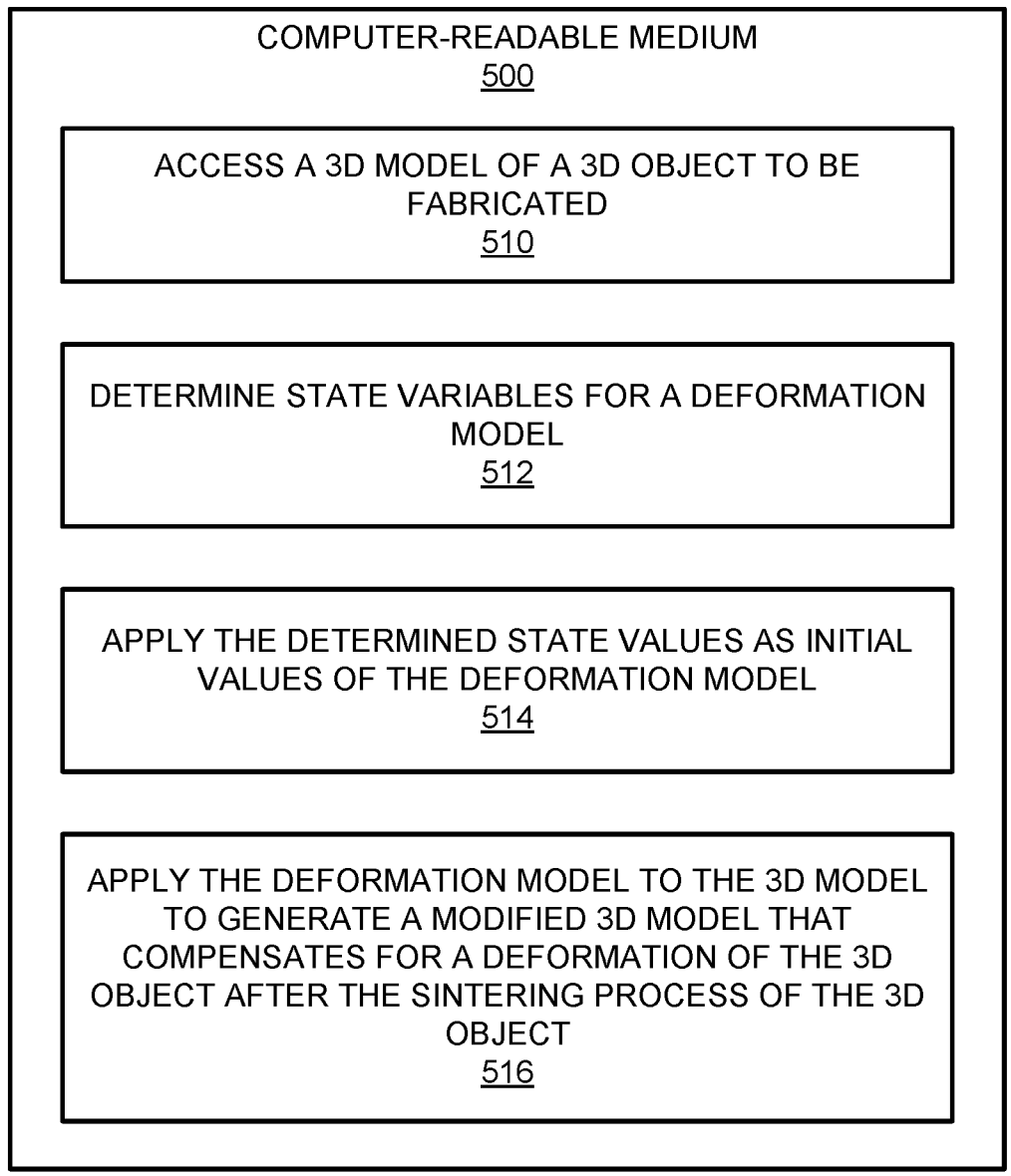
FIG. 5 depicts a block diagram of an example non-transitory computer-readable medium that may have stored thereon machine-readable instructions for applying a deformation model to a 3D model of a 3D object to generate a modified 3D model that compensates for a determined deformation of the 3D object after a sintering process of the 3D object.

Turning now to FIG. 5, there is shown a block diagram of an example non-transitory computer-readable medium 500 that may have stored thereon machine-readable instructions 510-516 for applying a deformation model 222 to a 3D model 220 of a 3D object 320 to generate a modified 3D model 226 that compensates for a determined deformation of the 3D object 310 after a sintering process 304 on the 3D object 310. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium. The term "non-transitory" does not encompass transitory propagating signals.

The computer-readable medium 500 may have stored thereon machine-readable instructions 510-516 that a processor, such as the processor 102 depicted in FIGS. 1, 2A, and 2B, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like. The descriptions of the computer-readable medium 500 are made with reference to the features depicted in FIGS. 1-3 and the processor 102 may execute some or all of the machine-readable instructions 512-518.

Particularly, the processor may fetch, decode, and execute the instructions 510 to access a 3D model 220 of a 3D object 320 to be fabricated. The processor may fetch, decode, and execute the instructions 512 to determine state variables or state values 224 for a deformation model 222. In some examples, the deformation model 222 may compensate for a deformation in the 3D object 320 determined to occur after a sintering process 304 on the 3D object 310. In some examples, the state variables or state values 224 may be independent of mechanical loads on the 3D object 310.

The processor may fetch, decode, and execute the instructions 514 to apply the determined state variables or state values 224 as initial values of the deformation model 222. The processor may fetch, decode, and execute the instructions 516 to apply the deformation model 222 to the 3D model 220 to generate a modified 3D model 226 that compensates for the determined deformation of the 3D object 320 after the sintering process 304 on the 3D object 310. In some examples, the processor may execute instructions to determine the deformation of the 3D object 320 that is predicted to occur in the 3D object 320 based on an application of reversed values of the mechanical loads to the 3D object 320 while decrementing time in the deformation model.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory storing instructions executable by the processor to:
   access a three-dimensional (3D) model of a 3D object to be fabricated; and
   apply a deformation model to the 3D model to generate a modified 3D model that compensates for a determined deformation of the 3D object during sintering of the 3D object after the 3D object has been additively manufactured,
wherein the deformation model comprises a densification component associated with a density of the 3D object during the sintering and a deformation component associated with mechanical loads on the 3D object during the sintering,
and wherein the densification component has initial state values associated with the density of the 3D object at start of the sintering, where the density of the 3D object changes during the sintering.

2. The apparatus of claim 1, wherein the instructions are executable by the processor to further:
determine state values of the densification component,
wherein the determined state values are associated with the density of the 3D object during and at completion of the sintering.

3. The apparatus of claim 2, wherein
the state values of the densification component are determined independently of mechanical load values of the deformation component associated with the mechanical loads on the 3D object.

4. The apparatus of claim 2, wherein the initial state values are first initial state values, and the instructions are executable by the processor to further:
set the determined state values associated with the density at the completion of the sintering as second initial state values of the densification component in the deformation model.

5. The apparatus of claim 4, wherein the instructions are executable by the processor to further:
define, in the deformation model, a target shape that the 3D object has after the sintering; and
define deformation boundary conditions for the deformation component of the deformation model,
wherein the deformation boundary conditions comprise reversed mechanical loads corresponding to the mechanical loads on the 3D object during the sintering.

6. The apparatus of claim 5, wherein the mechanical loads comprise either or both of gravity and friction applied on the 3D object during the sintering.

7. The apparatus of claim 5, wherein
the deformation model is applied to the 3D model in reverse based on the determined state values and the defined deformation boundary conditions.

8. The apparatus of claim 7, wherein
the deformation model is applied to the 3D model in reverse by decrementing time in the deformation model.

9. The apparatus of claim 1, wherein the instructions are executable by the processor to further:
cause additive manufacture of the 3D object in accordance with the modified 3D model, the 3D object upon additive manufacture then subjected to the sintering.

10. A method comprising:
accessing, by a processor, a 3D model of a 3D object to be additively manufactured;
setting first initial state values of a densification component of a deformation model, the densification component associated with a density of the 3D object during sintering after the 3D object has been additively manufactured, the first initial state values associated with the density of the 3D object at start of the sintering;
determining, by the processor, state values of the densification component, the determined state values associated with the density of the 3D object during and at completion of the sintering;
setting, by the processor, the determined state values as second initial values of the densification component;
applying, by the processor, the deformation model to the 3D model to generate a modified 3D model that compensates for a determined deformation of the 3D object during the sintering process; and
causing, by the processor, additive manufacture of the 3D object in accordance with the modified 3D model, wherein the 3D object after additive manufacture is then subjected to the sintering.

11. The method of claim 10, wherein
the state values are determined based on the deformation model as applied to a predetermined 3D model different than the 3D model,
and wherein the state values of the densification component are determined independently of mechanical load values of a deformation component of the deformation model associated with mechanical loads on the 3D object during the sintering.

12. The method of claim 10, further comprising:
determining, by the processor, a target shape that the 3D object is to have after completion of the sintering; and
determining reverse deformation boundary conditions for the deformation model, the reverse deformation boundary conditions associated with mechanical loads applied to the 3D object during the sintering,
wherein the deformation model is applied in reverse based on the reverse deformation boundary conditions.

13. The method of claim 12, wherein the reverse deformation boundary conditions comprise either or both of a gravity value and a friction value that are reversed.

14. The method of claim 10, wherein
the deformation model is applied in reverse by decrementing time in the deformation model.

15. The method of claim 10, wherein causing additive manufacture of the 3D object in accordance with the modified 3D model comprises:
sending the modified 3D model to an additive manufacturing apparatus, the additive manufacturing apparatus then additively manufacturing the 3D object.

16. A non-transitory computer-readable medium storing machine-readable instructions executable by a processor to perform processing comprising:
accessing a 3D model of a 3D object to be fabricated;
setting first initial state values of a densification component of a deformation model, the densification component associated with a density of the 3D object during sintering after the 3D object has been additively manufactured, the initial state values associated with the density of the 3D object at start of the sintering;

determining state values of the densification component, the determined state values associated with the density of the 3D object during and at completion of the sintering, the state values determined independently of mechanical load values of a deformation component of the deformation model associated with mechanical loads on the 3D object during the sintering;

setting the determined state values at the completion of the sintering as second initial values of the densification component;

applying the deformation model to the 3D model to generate a modified 3D model that compensates for deformation of the 3D object during the sintering; and send the modified 3D model to an additive manufacturing apparatus that is to additively manufacture the 3D object in accordance with the modified 3D model, wherein the 3D object after additive manufacture is then subjected to the sintering.

17. The computer-readable medium of claim 16, wherein the processing further comprises:

determining the deformation of the 3D object based on application of reversed values of the mechanical loads to the 3D object while decrementing time in the deformation model.

* * * * *